United States Patent
Wallace

(10) Patent No.: US 8,699,801 B2
(45) Date of Patent: Apr. 15, 2014

(54) SYSTEMS AND METHODS FOR TRANSMITTING HIGH DYNAMIC RANGE IMAGES

(75) Inventor: William Eric Wallace, Waterloo (CA)

(73) Assignee: AGFA Healthcare Inc., Toronto (CA)

( * ) Notice: Subject to any disclaimer, the term of this patent is extended or adjusted under 35 U.S.C. 154(b) by 645 days.

(21) Appl. No.: 12/954,811

(22) Filed: Nov. 26, 2010

(65) Prior Publication Data

US 2012/0134551 A1 May 31, 2012

(51) Int. Cl.
*G06K 9/36* (2006.01)
*G06K 9/46* (2006.01)

(52) U.S. Cl.
USPC ............. 382/232; 382/234; 382/244

(58) Field of Classification Search
USPC .................... 382/232, 234, 244
See application file for complete search history.

(56) References Cited

U.S. PATENT DOCUMENTS

| | | | |
|---|---|---|---|
| 5,764,235 A | 6/1998 | Hunt | |
| 6,744,929 B1 * | 6/2004 | Okada | 382/251 |
| 2003/0179938 A1 * | 9/2003 | Van der Vleuten | 382/232 |
| 2005/0192799 A1 * | 9/2005 | Kim et al. | 704/229 |
| 2006/0233446 A1 * | 10/2006 | Saito et al. | 382/232 |
| 2007/0217704 A1 * | 9/2007 | Zeng et al. | 382/244 |
| 2007/0237409 A1 * | 10/2007 | Atsumi et al. | 382/239 |
| 2011/0154426 A1 * | 6/2011 | Doser et al. | 725/118 |
| 2012/0127533 A1 * | 5/2012 | Triplett et al. | 358/3.06 |

FOREIGN PATENT DOCUMENTS

| | | | |
|---|---|---|---|
| EP | 2098994 | 9/2009 | |
| WO | WO01/84501 | 11/2001 | |
| WO | WO2008/022282 | 2/2008 | |
| WO | WO 2010021705 A1 * | 2/2010 | H04N 7/24 |

OTHER PUBLICATIONS

Yu, Y.—"Improving Compression Performance in Bit Depth SVC with a Prediction Filter"—JVT-Z045, Jan. 2008, pp. 1-7.*
European Search Report, Application No. EP 2098994, dated Jul. 25, 2008.
Stegmaier S. et al. "Widening the Remote Visualization Bottleneck", Image and Signal Processing and Analysis, 2003. ISPA 2003. Proceedings of the 3rd International Symposium on Rome, Italy, Sep. 18-20, 2003, Piscataway, NJ USA, IEEE.

* cited by examiner

*Primary Examiner* — Bernard Krasnic
(74) *Attorney, Agent, or Firm* — Bereskin & Parr LLP; Isis Caulder

(57) ABSTRACT

A method of processing an image, the image having pixel data with a bit range not capable of being encoded in a selected encoding format, the method comprising: splitting the pixel data into a base channel and at least one delta channel, at least one of the base channel and the at least one delta channel capable of being encoded in the selected encoding format; encoding at least one of the base channel and the at least one delta channel; transmitting the base channel and the at least one delta channel to a client; decoding the base channel and the at least one delta channel at the client; and recombining the base channel and the at least one delta channel at the client to form the pixel data. In some embodiments, the method further comprises: applying a window level to the pixel data formed from said recombining; and displaying the window level on a display.

14 Claims, 10 Drawing Sheets

PIXEL DATA:

PNG:

PIXEL DATA:

IMAGE 1:   JPG (LOSSY BASE CHANNEL)
422 — R = G = B :   6 C

IMAGE 2:   PNG (LOSSLESS DELTA CHANNELS)
442 — R:   -1
444 — G:   2 8
B:   0
A:   0

FIG. 4B 442
422
LOSSY BASE CHANNEL: ENCODE (PIXEL DATA / 256)
LOSSLESS DELTA CHANNEL "R" : (PIXEL DATA / 256) - LOSSY BASE CHANNEL
LOSSLESS DELTA CHANNEL "G" : (PIXEL DATA % 256)
444

FIG. 4C 422                                   442
(LOSSY BASE CHANNEL + LOSSLESS DELTA CHANNEL "R") x 256
   + LOSSLESS DELTA CHANNEL "G"
444

FIG. 4D

IMAGE 1: JPG (LOSSY BASE CHANNEL)
932 — R = G = B : 9 2

IMAGE 2: PNG (LOSSLESS DELTA CHANNELS)
942 — R: 5
G: 0
B: 0
A: 0

SYSTEMS AND METHODS FOR TRANSMITTING HIGH DYNAMIC RANGE IMAGES

FIELD

The embodiments described herein relate to systems and methods for transmitting high dynamic range images.

INTRODUCTION

Medical images having a high dynamic range are often stored on one or more servers. To access such images on a remote computing device, the device typically needs to include a client application that facilitates the receiving and processing of the high dynamic range images. Installing such client applications may not always be possible. As a result, there is also a desire to view such images on remote computing devices through standard applications (such as an internet or web browser) that may be installed by default on such devices. Thus, there is a need for improved methods of transmitting a high dynamic range image so that it can be received and processed by such standard applications.

SUMMARY

The embodiments described herein provide in one aspect, a method of processing an image, the image having pixel data with a bit range not capable of being encoded in a selected encoding format, the method comprising:
  a) splitting the pixel data into a base channel and at least one delta channel, at least one of the base channel and the at least one delta channel capable of being encoded in the selected encoding format;
  b) encoding at least one of the base channel and the at least one delta channel;
  c) transmitting the base channel and the at least one delta channel to a client;
  d) decoding the base channel and the at least one delta channel at the client; and
  e) recombining the base channel and the at least one delta channel at the client to form the pixel data.

The embodiments described herein provide in another aspect, a system for processing an image, the image having pixel data with a bit range not capable of being encoded in a selected encoding format, the system comprising:
  a) one or more memories for storing the image; and
  b) one or more processors coupled to the one or more memories for:
    i) splitting the pixel data into a base channel and at least one delta channel, at least one of the base channel and the at least one delta channel capable of being encoded in the selected encoding format;
    ii) encoding at least one of the base channel and the at least one delta channel;
    iii) transmitting the base channel and the at least one delta channel to a client;
    iv) decoding the base channel and the at least one delta channel at the client; and
    v) recombining the base channel and the at least one delta channel at the client to form the pixel data.

The embodiments described herein provide in further aspect a method of encoding an image, the image having pixel data and at least one color channel, the method comprising: encoding the image by splitting the pixel data of each color channel into a base channel and at least one delta channel.

Further aspects and advantages of the embodiments described herein will appear from the following description taken together with the accompanying drawings.

DRAWINGS

For a better understanding of the embodiments described herein and to show more clearly how they may be carried into effect, reference will now be made, by way of example only, to the accompanying drawings which show at least one example embodiment, and in which:

FIG. 4A is a schematic diagram of a layout in hexadecimal form of pixel data in an example image with a dynamic range of 16-bits;

FIG. 4B is a schematic diagram of an example layout in a lossy base channel and a lossless delta channel of the pixel data illustrated in FIG. 4A;

FIG. 4C is an illustration of the example operations that may be used to derive the lossy base channel and the lossless delta channel illustrated in FIG. 4B;

FIG. 4D is an illustration of example operations that may be used to recombine the base and delta channels illustrated in FIG. 4B;

Figure 1:
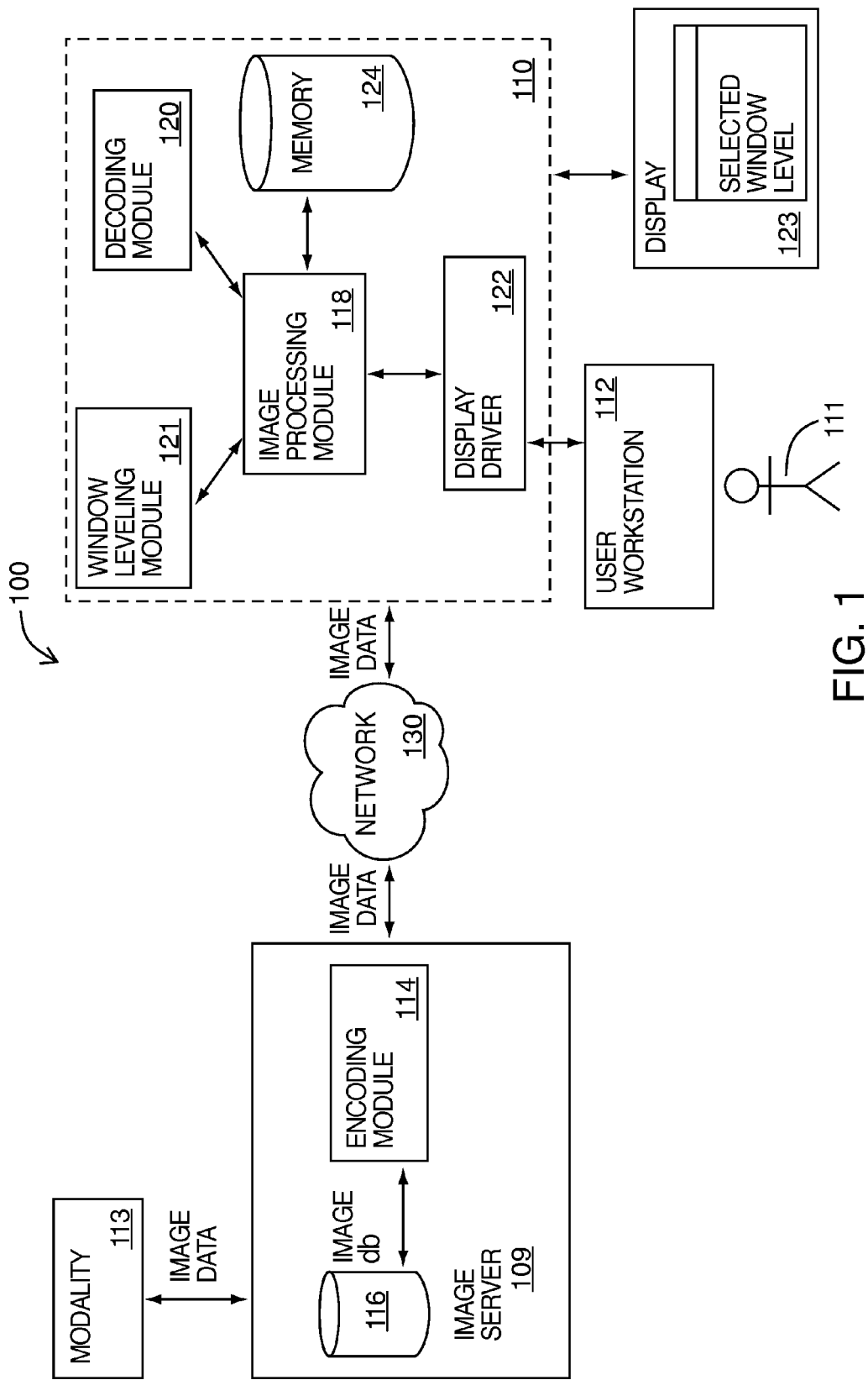
FIG. 1 is a block diagram of various embodiments of an image viewing system.

It will be appreciated that for simplicity and clarity of illustration, elements shown in the figures have not necessar-

DETAILED DESCRIPTION

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. Some embodiments are implemented in computer programs executing on programmable computers each comprising at least one processor, a data storage system (including volatile and non-volatile memory and/or storage elements), at least one input device, and at least one output device. For example and without limitation, the programmable computers may be any appropriate computing device including but not limited to a personal computer, laptop, a tablet computer, personal data assistant, smart phone, and a cellular telephone. Program code is applied to input data to perform the functions described herein and generate output information. In various embodiments, the input data relates to medical images generated by modalities. The output information is applied to one or more output devices, in known fashion. In various embodiments, the output information relates to medical images, which may for example display tissues and organs. In some embodiments, the medical images are displayed on a display, which could be for example a display of any appropriate computing device.

In some embodiments, each program is implemented in a high level procedural or object oriented programming and/or scripting language to communicate with a computer system. However, the programs can be implemented in assembly or machine language, if desired. In any case, the language may be a compiled or interpreted language. In some embodiments, the SVG scripting language as understood by a standard Internet or web browser may be used to implement subject matter described herein. Each such computer program is preferably stored on a storage media or a device (e.g. ROM or magnetic diskette) readable by a general or special purpose programmable computer, for configuring and operating the computer when the storage media or device is read by the computer to perform the procedures described herein. In some embodiments, the system may also be considered to be implemented as a computer-readable storage medium, configured with a computer program, where the storage medium so configured causes a computer to operate in a specific and predefined manner to perform the functions described herein.

Furthermore, in various embodiments, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Some of the embodiments described herein relate to systems and methods that apply a window level to a high dynamic range image after it has been encoded, transmitted, decoded and recombined at a client. Some of the embodiments relate to displaying a window level of an image on a display of a computing device, where the image is stored on a remote server. As mentioned above, in some embodiments, the images may be medical images. For example, the images can be images of a patient that are generated by a modality, and can comprise images of tissues, such as for example but not limited to bones, soft tissues, and organs. Such images can also include images of any objects located inside a patient, including but not limited to medical implants and foreign objects that may need to be removed such as for example, bullets or shrapnel. As will be explained in greater detail below, particular window levels may be selected to better display particular features (e.g., particular objects, organs or tissue) on such objects.

Medical images produced by modalities often have a higher dynamic range than most common computing devices are able to process and display. For example, medical images may be 12 or 16 bit images; while, the program or display used to view these images may be only capable of displaying 8 bit gray scale images (or 24 bit RGB or 32 bit RGBA color images). In addition, a typical human eye can generally discern intensities with a fidelity that is equivalent to about 9 bits. For example, a browser may be used to view the image and, in some cases, the browser may only support 8 bit images. To address this, the entire 12 or 16 bit image could be converted to an 8 bit image; however, this can result in a significant amount of data being lost and therefore a low fidelity image.

Window leveling can be used to convert the 12 or 16 bit images (or windows of the 12 or 16 bit images) to 8 bit images in a way that produces higher fidelity images than simply converting the entire high dynamic range image to a low dynamic range image. Generally, when a window level is used to convert a high dynamic range image to an image with a lower dynamic range, information or data is lost. Therefore, a window is generally selected so as to preserve the data of interest while discarding the data that is not of interest. Accordingly, window leveling can be used to convert a specific region of the original dynamic range to a lower dynamic range such that the specific region has high fidelity preserved, but other regions are much lower fidelity. Further details regarding the operation of window leveling is described below.

In known systems, a window level is requested by a client and generated at a server. The window level is then transmitted to the client for viewing using an encoding format that the client is capable of processing. For example, the returned window level may be encoded using an 8-bit grayscale JPG image. In addition, any time a different window level is requested, even for the same original image, the entire process is generally repeated. For example, the request is sent to the server and the server generates a new window level from the image and then transmitted. Such systems can be rather slow and unresponsive from the perspective of the user. For example, there can be a significant delay in displaying the initially requested window level. In addition, any adjustments to the window level generally require information to be transmitted back and forth from the server, which again can introduce delays and can cause slow response times. If the window manipulation can be performed on the client itself, a medical practitioner modifying the window level would have a more responsive experience because fewer messages would need to be sent across the network.

There is thus a need for improved methods of transmitting an image having pixel data with a bit range not capable of being encoded in a selected encoding format (i.e., in a format that would typically be understood by standard applications such as a browser) to a client device.

Reference is now made to FIG. 1, which illustrates a block diagram of the basic elements of various embodiments of image viewing system 100. Specifically, image viewing system 100 includes a server 109 and a client 110. Server 109 includes an encoding module 114 and a memory device 116 for storing an image database. In various embodiments, client 110 includes a workstation 112, an image processing module 118, a decoding module 120, window leveling module 121, a display driver 122, a display 123, and a memory device 124. In other embodiments, workstation 112 includes client 110. In some embodiments, workstation 112 is separate from but interoperates with client 110. In various embodiments, memory devices 116 and 124 include physical storage media. In some embodiments, server 109 may cache images and can include a separate storage device (not illustrated) for this purpose. In various embodiments, image server 109 can also pre-cache images. The workstation 112 and display 123 may be accessed by a user 111, which in some embodiments, may be a medical practitioner.

It should be understood that, as with the other figures disclosed herein, FIG. 1 is meant to be illustrative only. Other embodiments can utilize other configurations. For example, in some embodiments, image server 109 does not include an image database. In some such embodiments, image server 109 can connect to a PACS (Picture Archiving Communication System) module, which in turn may be coupled to an indexing database and an image database. The image server 109 may communicate with the PACS module, which may either provide a requested image or it may provide a location of the requested image in the image database and image server 109 may retrieve the image from the image database directly. In some embodiments, server 109 may include a storage device for caching images.

As discussed in more detail above, it should be understood that image viewing system 100 may be implemented in hardware or software or a combination of both. Specifically, at least some of the modules of image viewing system 100 may be implemented in computer programs executing on programmable computers each comprising at least one processor, a data storage system and at least one input and at least one output device. Without limitation the programmable computers may be a mainframe computer, server, personal computer, laptop, a tablet computer, personal data assistant, smart phone, or cellular telephone. In some embodiments, the modules of image viewing system 100 are implemented in software and installed on the hard drive of user workstation 112 and on server 109, such that user workstation 112 (and client 110) interoperates with image server 109 in a client-server configuration. In some embodiments, the image viewing system 100 can be configured to run remotely on the user workstation 112 while communication with the image server 109 occurs via a wide area network (WAN), such as through the Internet. In various embodiments, client 110 includes software such as an Internet browser for viewing images, and the decoding module 120 and/or the window leveling module 121 may be implemented through execution of instructions in a scripting language interpreted by the Internet browser. In some embodiments, the Internet browser is a standard Internet browser that may be pre-installed on the client 110 system. For example, in various embodiments, the Internet browser does not require any additional plug ins.

As discussed, some embodiments disclosed herein relate to a method of transmitting images with larger bit range data over smaller bit range channels. In some embodiments, the pixel data for the original image has a bit range or dynamic range that is not capable of being encoded in a selected encoding format (e.g., 12-bit mammography images not being capable of being encoded in an encoding format such as Portable Network Graphics (PNG) or Joint Photographic Experts Group (JPG)) because the bit range or dynamic range may be too large for the selected encoded format. In such scenario, the pixel data for the original image may be split up into a base channel and at least one delta channel, the base channel and the at least one delta channel having a smaller bit range than the bit range of the pixel data for the original image so as to allow the channel(s) to be capable of being encoded in the selected encoding format. That is, the original image may have a first dynamic range, and at least one of the base channel and the at least one delta channel may have a dynamic range that is less than the first dynamic range. As described below, in one embodiment, the base and delta channel(s) may be embodied in two or more color channels of the selected encoding format.

Figure 2:
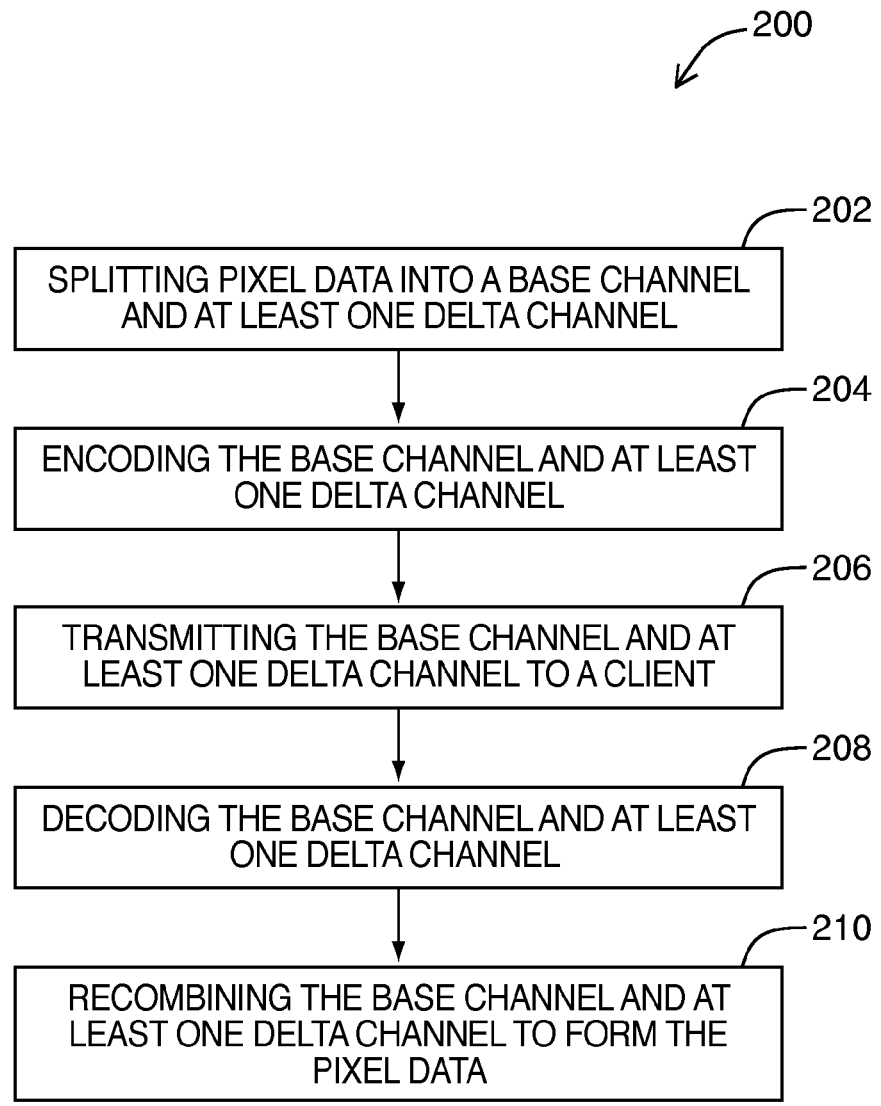
FIG. 2 is a flowchart diagram of an example set of operation steps executed when transmitting an image having a high dynamic range, according to one embodiment of the present disclosure.

Referring to FIG. 2, illustrated there is an example flowchart diagram of an example set of operation steps executed when transmitting an image having a high dynamic range, shown generally as 200. An image is first requested from image server 109. In some embodiments, the image is a medical image. In various embodiments, the requested images can be, but are not limited to, 32 bit, 16 bit, and 12 bit images.

Figure 3A:
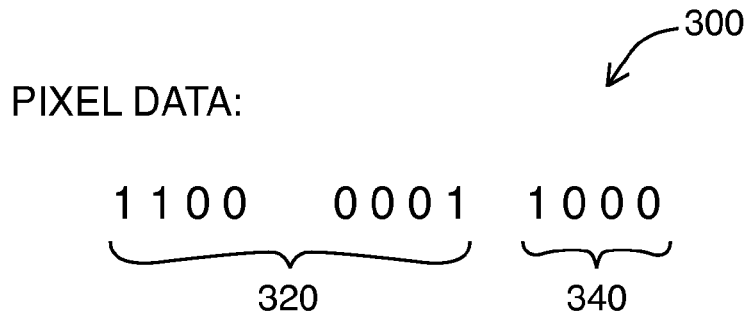
FIG. 3A is a schematic diagram of a layout in binary form of pixel data in an example image with a dynamic range of 12-bits.

At block 202, the pixel data in the requested image having pixel data is split into a base channel and at least one delta channel. Referring simultaneously to FIG. 3A, shown there generally as 300 is example 12-bit grayscale pixel data (as may be generated by a mammography modality 113, for example) being split into a base channel value 320 and a delta channel value 340. The base channel value 320 includes 8 high order bits ("1100 0001"), and the delta channel value 340 includes the 4 low order bits ("1000").

At block 204, the image server 109 encodes the base channel value 320 and at least one delta channel value 340. As alluded to above, the pixel data of the image may have a bit range that is larger than is capable of being encoded in encoding formats (e.g., PNG, JPG) that standard browsers are capable of processing. However, once the pixel data has been split into the base channel value 320 and delta channel(s) value(s) 340, they may contain smaller bit ranges that is less than the bit range of the original image, and may be capable of being encoded using such formats.

The selected encoding format may be include lossy and lossless encoding formats. An example lossless encoding format may be PNG or Tag Image File Format (TIFF), and an example lossy encoding format may be JPG. However, it should be understood that other lossy and lossless encoding formats may also be used.

Figure 3B:
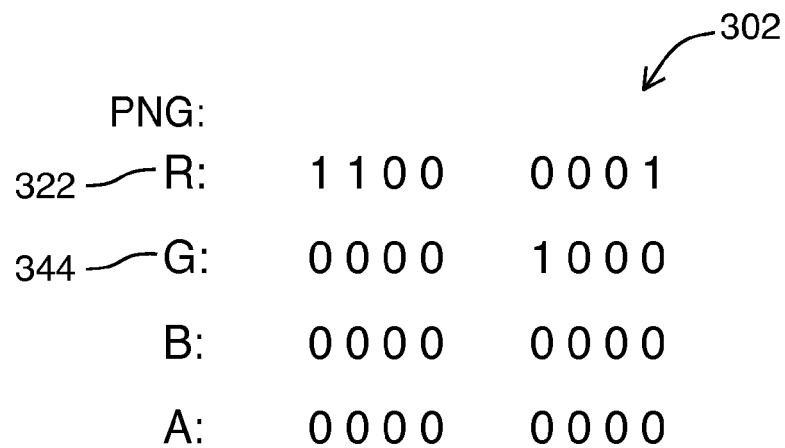
FIG. 3B is a schematic diagram of an example layout in base and delta channels of the pixel data illustrated in FIG. 3A.

Referring simultaneously to FIG. 3B, shown there generally as 302 is the pixel data illustrated in FIG. 3A placed into the color channels of a PNG encoding format for encoding. Specifically, it can be seen that the base channel value 320 ("1100 0001") has been placed into the 'R' color channel of the encoding format for encoding, and the delta channel value 340 ("1000") has been placed into the 'G' color channel for encoding. Accordingly, the 'R' color channel can be considered the base channel 322, and the 'G' color channel can be considered a delta channel 344. Since the pixel data only had 12-bits, no data was placed into the 'B' and 'A' color channels. The pixel data in the base channel 322 and the at least one delta channel 344 are then encoded using the selected encoding format (PNG, in this case). The steps performed by the encoding formats (and the bit representation of the encoded data) are not discussed herein as such steps are known in the art.

At block 206, the image server 109 transmits the encoded base channel 322 and the at least one delta channel 344 to a client 110 through network 130.

At block 208, the decoding module 120 at the client 110 decodes the base channel 322 and delta channel 344 from their encoded format. If a lossless encoding format was used, the data in the base channel 322 and at least one delta channel 344 will remain intact without any modification after decoding. Referring again to FIG. 3B, since PNG is a lossless encoding format, the base channel 322 and the delta channel 344 maintain the bit integrity of the base channel value 320 and delta channel value 340 after decoding. As is discussed below in relation to FIG. 4, when a lossy encoding format is used to encode base channel value 320, additional color channels may be used to store additional delta channel values 340 that "correct" for the lossy encoding.

At block 210, the image server 109 recombines the base channel value 320 in base channel 322 and the delta value 340 in the at least one delta channel 344 at the client 110 to form the original pixel data.

Figure 3C:
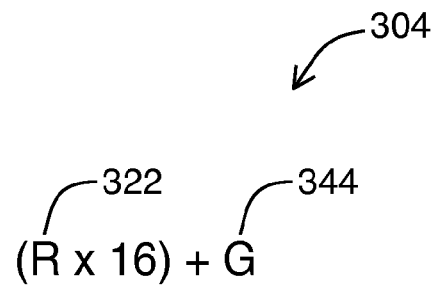
FIG. 3C is an illustration of example operations that may be used to recombine the base and delta channels illustrated in FIG. 3B.

Referring simultaneously to FIG. 3C, illustrated there generally as 304 are example operations that may be used to reconstitute the original pixel data in the transmitted base channel 322 and the at least one delta channel 344. It can be seen that the operations used to recombine the pixel data can be performed using simple arithmetic pixel operations. Such operations may be provided in a scripting language (or a scripting component of an encoding image file format) that can be interpreted by standard applications (such as a web browser) on a client remote computing device 110. For example, such operations may be provided in the script element of an electronic file stored in Scalable Vector Graphics (SVG) format.

Using simple arithmetic operations to recombine the high dynamic range data removes the need of a native client application to be installed on the client remote computing device. Because a browser is able to receive and recombine the base and one or more delta channels to form the full dynamic range of the pixel data, accurate representations of such images may be displayed on the remote computing device without requiring technical personnel to interact with the remote computing device to install a client application. In effect, it enables client remote computing devices to receive and display such images "out of the box".

The script would be able to access the individual color channels of the received PNG file, and perform the operations indicated. In the example, the data in the 'R' color channel (i.e., the base channel 322) of the PNG image file would be multiplied by 16 to bit shift the data 4 bits to the left, and then added to the data in the 'G' color channel (i.e., the delta channel 344). The resulting binary data would be the reformulated pixel data illustrated in FIG. 3A.

A window level can then be applied to the pixel data formed from the recombining step, and the window level can be displayed on a display 123.

Discussion now turns to a more complicated example where a lossy channel is used, and where the base and delta channels are distributed among a plurality of electronic files. In the example, the encoding step encodes the base channel in a selected encoding format, and the at least one delta channel in an alternate encoding format. Simultaneous reference will be made below to the steps illustrated in FIG. 2.

Referring to FIG. 4A, illustrated there generally as 400 is example pixel data from a 16-bit grayscale image (as may be generated from a computed tomography (CT) modality 113, for example). For simplicity of illustration, the bit-level pixel data has been illustrated in hexadecimal format. Similar to FIG. 3A, a first step can be to split the pixel data into a base channel value 420 and at least one delta channel value 440 (block 202). In this case, the 8 high order bits "6 B" form the base channel value 420 and the 8 low order bits "2 8" form a delta channel value 440.

Referring to FIG. 4B, illustrated there generally as 402 is the layout of the pixel data illustrated in FIG. 4A after being encoded into a lossy base channel 422 and lossless delta channels 442, 444 (block 204). In this embodiment, the lossy base channel 422 and lossless delta channels 442, 444 are distributed among a plurality of electronic files. That is, the lossy base channel 422 is provided via an electronic file stored in the lossy JPG format (shown as 'Image 1'), whereas the lossless delta channels 442, 444 are provided via an electronic file stored in the PNG format (shown as 'Image 2'). Further, the encoding step encodes the lossy base channel 422 in a selected encoding format (i.e., JPG), and the at least one lossless delta channel 442, 444 in an alternate encoding format (i.e., PNG). In the example, the lossy JPG image is stored as an 8-bit grayscale image, in which the 'R', 'G' and 'B' color channels (forming the lossy base channel 422) all equal each other. Because the encoding is lossy, the resultant encoded value may not correspond exactly to the respective bits in the pixel data shown in FIG. 4A. As such, the high order bits "6 B" is encoded as "6 C" in the lossy base channel 422. In such case, an additional lossless delta channel 442 may be provided to enable the lossy value encoded in the lossy base channel 422 to be "corrected" upon recombination.

As noted, in some embodiments, a lossy encoding format may be used when encoding the pixel data. Employing a lossy encoding format may be advantageous because a lossy encoding can be performed more quickly than a lossless encoding, even though it may result in lossy encoded values. In some scenarios, this may allow a medical practitioner to experience increased responsiveness when viewing an image. For example, if the lossy base channel 422 (including the high order bits of the image pixel data) is encoded using a lossy encoding format (such that it would include lossy encoded values), and such lossy base channel 422 is transmitted prior to the transmitting of the at least one lossless delta channels 442, 444 (including delta value to correct the lossy base channel 422, and the low order bit range of the pixel data), the lossy base channel 422 may be decoded and displayed immediately while the remaining lossless delta channels 442, 444 are encoded/transmitted. When the lossless delta channels 442, 444 are received, it can then be recombined with the lossy base channel 422 to display the full dynamic range of the pixel data. This scenario is discussed in greater detail below in relation to FIG. 7.

Referring to FIG. 4C, there is shown, generally as 406, example operations that may be used to generate the lossy base channel 422 and lossless delta channels 442, 444. Although lossy delta channels (i.e., using a lossy encoding format to encode delta values) may be used for improved performance, it should be noted that having lossless delta channels 442, 444 helps to ensure that accurate pixel data can be achieved when recombining with the lossy base channel

422. The illustrated operations may be executed on the original pixel data by the encoding module 114 on image server 109.

In the example, the lossy base channel 422 may be derived by encoding values for the high order bits of the pixel data. To derive the high order bits, the pixel data may be divided by 256 using an integer division operation. (The integer division operation returns the high order bits by bit shifting the 16-bit pixel data by 8 bits to the right). Once derived, the high order bits may be encoded using a lossy encoding format.

Two separate lossless delta channels 442, 444 may then be derived using a lossless encoding format, the delta channels 442, 444 collectively making up a lossless difference between the image pixel data and the lossy encoded values in the lossy base channel 422. The first lossless delta channel 442 may be stored in the 'R' color channel of the PNG file, and may be derived using the difference between the high order bits of the pixel data (i.e., as derived by the integer division of the pixel data by 256) and the encoded lossy value in the lossy base channel 422. In the example, this is the difference between the hexadecimal value '0x6B' and '0x6C', which is −1. The storage of '−1' as a signed number in a binary format may be performed according to methods known in the art, such as two's complement or excess-n (i.e., using a positive offset to indicate the value '0'). When using an offset, for example, the offset can be added to the derived difference before encoding, and correspondingly subtracted after decoding and before recombining.

The second lossless delta channel 444 may be stored in the 'G' color channel of the PNG file, and may just include the low order bits of the pixel data. This may be derived using a modulo operation, as indicated by the '%' symbol, on the pixel data over 256. As is known in the art, the modulo operation returns the remainder in the arithmetic operation of one number divided by another. When used in conjunction with the pixel data and 256, the operation has the effect of returning the 8 rightmost bits.

The encoded values in the lossy base channel 422 and the lossless delta channels 442, 444 may then be transmitted to a client 110 (block 206), and correspondingly decoded at a client 110 using the encoding format in which the channels were originally encoded (block 208).

Referring to FIG. 4D, there is shown, generally as 404, operations for recombining the transmitted base channel 422 and lossless delta channels 442, 444 (block 210) derived using the operations used in FIG. 4C. Similar to the recombining operations discussed in FIG. 3C, this operation may be incorporated into a scripting language that can be interpreted by a web browser. In this example, since the lossy base channel 422 was encoded using the lossy JPG encoding format, the first lossless delta channel 442 (i.e., the 'R' color channel of the lossless PNG encoding format) is added to the lossy base channel 422 to "correct" the loss so as to arrive at the correct high order bits. In this case, the lossless delta channel 442 holds a value of '−1', which may be added to the value in the lossy base channel 422 ('0x6C') to arrive at '0x6B', which is the correct pre-transmission base channel value 420 in the original pixel data. This is then multiplied by 256 to shift the value 8 bits to the left, and summed up with the value in the 'G' color channel of the PNG format (i.e., the second lossless delta channel 444). As noted above, the second lossless delta channel 444 contains the low order bits of the pixel data. The result of executing the operations would thus be the result of evaluating '0x6B00'+'0x0028', which is the hexadecimal value '0x6B28', a value equivalent to the origin pixel data value.

It will be understood that the numeric values provided in the operations are provided for illustration purposes only. Also, those skilled in the art will appreciate that the pixel data may be broken down and encoded along various alternate bit offsets. For example, in relation to the 16-bit grayscale pixel data above, an alternate embodiment may be to only include the 4 highest order bits in the lossy base channel 422 (allowing for a faster lossy encoding, for example), and then to store the 12 lower-order bits in one or more of the 'G', 'B' and 'A' color channels of the lossless PNG file as a delta values. In such embodiment, the 'R' channel of the PNG file may store the difference value necessary to 'correct' the lossy base channel 422.

It should also be understood that storage into any of the 'R','G','B' or 'A' color channels in any encoding format is shown for illustrative purposes only. That is, while the 'R' channel is discussed, any other color channel in the encoding format can suitably be used to store the same data.

Once the full range of the pixel data has been reconstituted at the client 110, a particular window level of the original image can be selected for viewing. In some embodiments, the client 110 comprises a web browser that supports only images that have a lower bit dynamic range than the original image. For example, the client 110 may only support 8 bit images, while the requested image is of a higher bit value so that performing a window level operation on the reconstituted pixel data may be necessary. In some embodiments, the selection of a window level can be performed in parallel with some of the other steps described above. In other embodiments, selecting a window level can be performed in series with these steps. The window leveled pixel data may then be displayed on a display 123.

For clarity, a discussion of further details in relation to window leveling now follows.

As noted, window leveling can be used to convert a portion of the dynamic range of an image that has a high dynamic range into a new image that has a lower dynamic range. In various embodiments, window leveling can be described as a linear transform on the pixel values of the original image. For example, window leveling is the standard DICOM term for a lookup table (LUT) function, where the function is a linear map. The portion of the high dynamic range image that is converted can be all or a part of the dynamic range of the original image. The term window refers to the portion or range of intensities that are selected for viewing. The term level refers to the function that maps the pixel intensities in the window of the original image to the pixel intensities of the new image. The level function can, for example, be used to skew the relative intensities of the pixels in the image as compared to the original image.

Figures 5A, 5B:
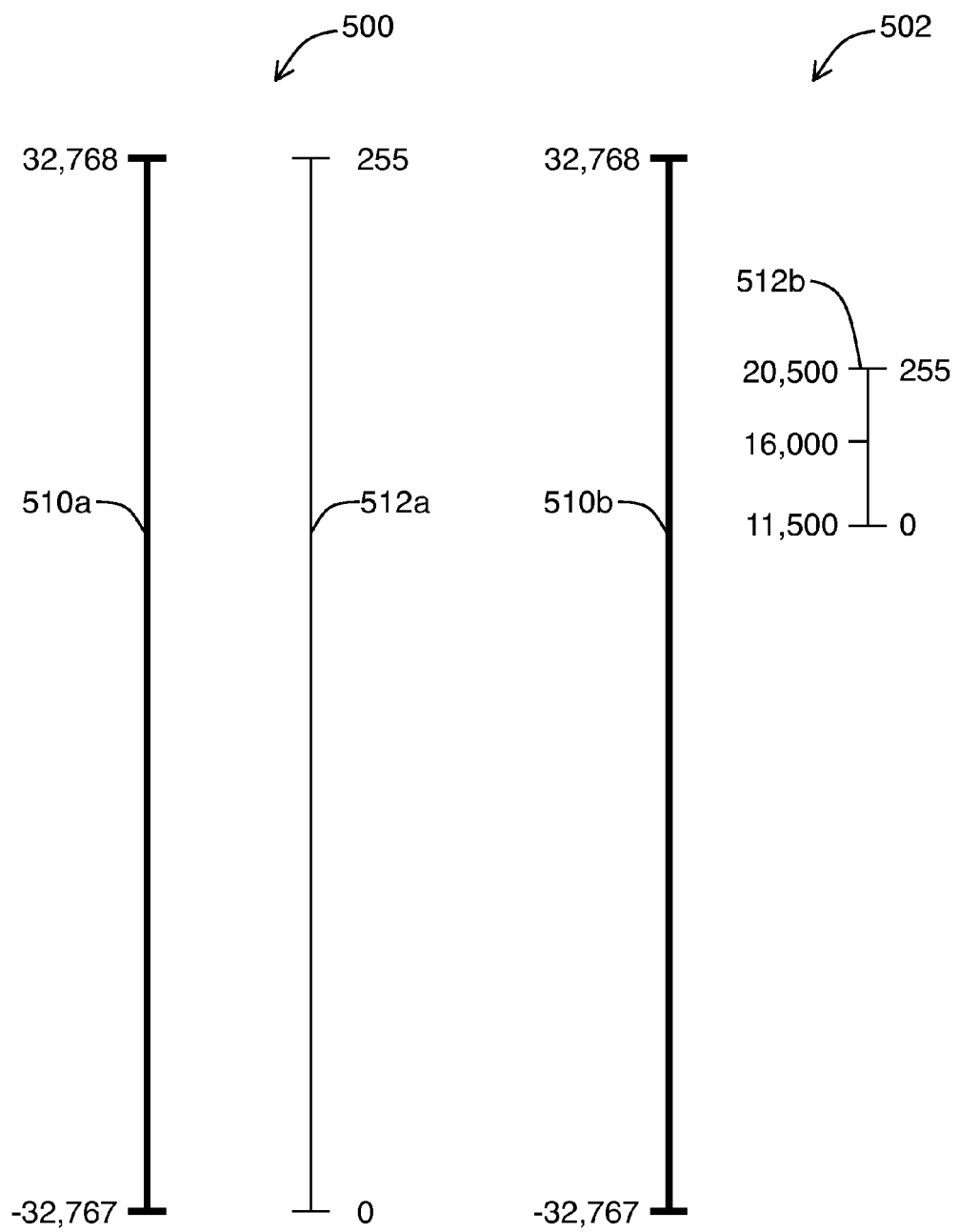
FIGS. 5A and 5B are schematic diagrams illustrating example windows that may be used by the embodiments described herein during window level selection.

Referring to FIGS. 5A and 5B, illustrated there are example windows, shown generally as 500 and 502. FIG. 5A illustrates the case where the window 512a spans the entire dynamic range of the original image 510a. More specifically, the bar on the left illustrates the dynamic range, or the range of pixel values, in the original image 510a and the bar on the right illustrates the portion of the dynamic range of the original image that is incorporated in the window. In FIG. 5A the window is the entire image with a width of w=65,536. The bar on the right illustrates the range of images in the new image. The numbers on either side of the ends of window 512a illustrating the mapped values of the window from the original image. Specifically, 0 in the window level corresponds to −32,767 in the original image and 255 in window level 512a corresponds to 32,768 in the original image. The level function is not illustrated. In the case of FIG. 5A, the entire original image is converted into an 8 bit image. However, by doing so a significant amount of data can be lost.

FIG. 5B illustrates the case where the window 512b has a width of w=9000 and is centered at c=16000. Here the window is only a portion of the dynamic range of the original image 510b. More specifically, the bar on the left illustrates the range of pixel values in the original image as well as the portion that is incorporated in the window. The bar on the right illustrates the range of pixel intensity values in the window. The numbers on either side of the ends of window 512b illustrate the mapping of the extreme values of the window to the pixel values of the original image. Specifically, 0 in the window level corresponds to 11500 in the original image and 255 in window level 512b corresponds to 20,500 in the original image. Again, the level function is not illustrated.

As noted, medical images often have features that show up in specific ranges of intensities. For example, bone may show up as a very high intensity (e.g. white); while, soft tissue may show up as lower intensity (e.g. dark gray or black). The window could be selected such that the window corresponds to the range of intensities of interest in the image to which the window is applied. In addition, or in alternative to this, the level function could be used to skew the relative intensities of pixels in a given range to accentuate features in that range. For example, important features may be separated by intensity values that are very close in magnitude, which may be difficult for the human eye to distinguish, and therefore a medical practitioner may have difficulty spotting and assessing these features. It can therefore be useful at times to expand the relative values of pixel intensities that correspond to potential features of interest by using an appropriate level function.

Figure 6:
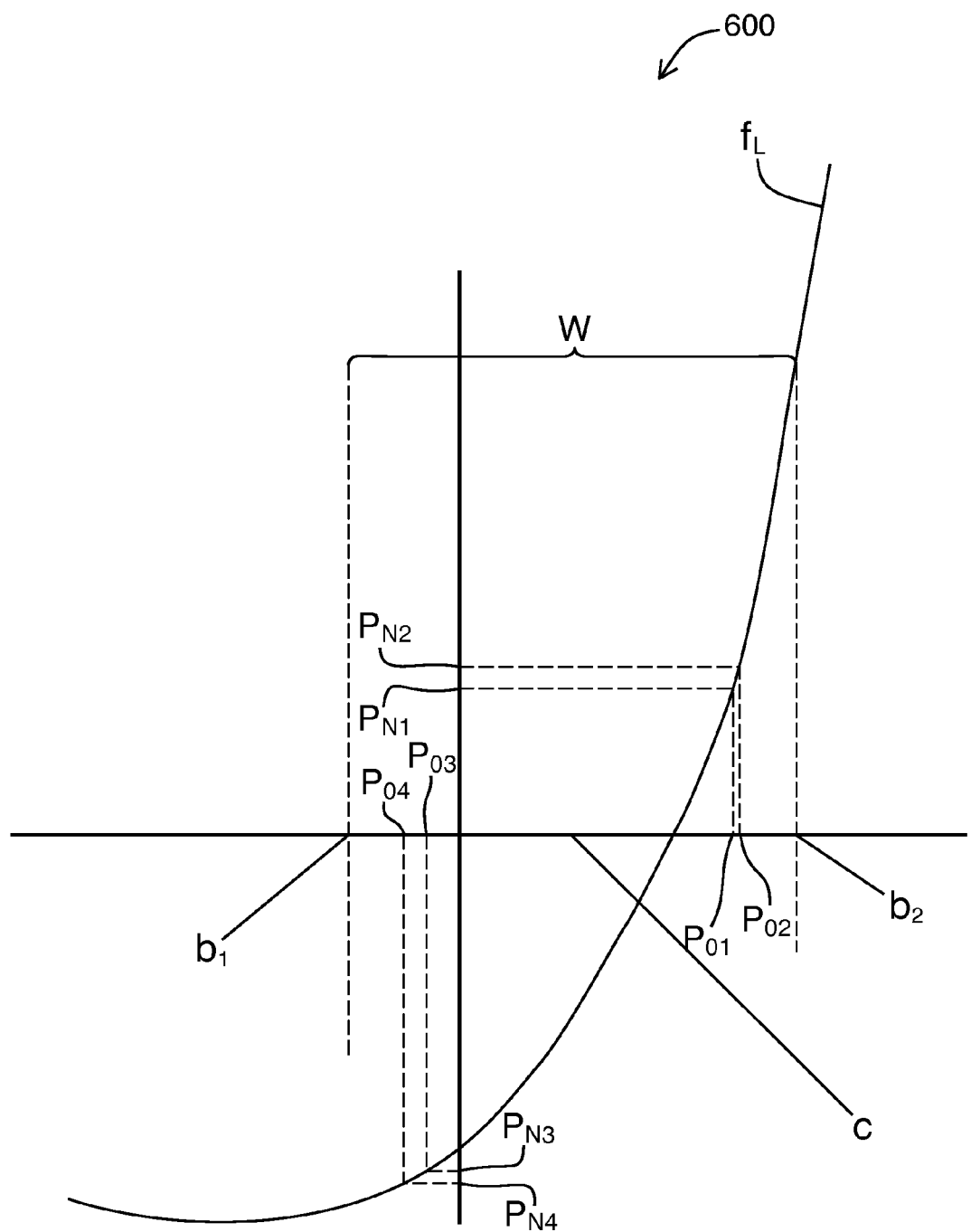
FIG. 6 is an example window level transformation function.

Reference is now made to FIG. 6, which is a graph, shown generally as 600, illustrating a window level transformation function. The level function is the curve indicated by reference indicium $f_L$. The values of the original image are represented on the x-axis and the values generated by the window level function are represented on the y-axis. The window has a width of W=27,853 and is centered at c=4,915 and boundaries at $b_1$=−8,192 and $b_2$=19,661, which are indicated by reference indicia $b_1$ and $b_2$ respectively. Level function $f_L$ accentuates and expands the higher intensity pixel values in the window and suppresses and contracts the lower intensity values in the window. For example, pixel values $P_{O1}$=16,382 and $P_{O2}$=16,384 in the original image are mapped to values $P_{N1}$=32 and $P_{N2}$=39 respectively in the window; while, pixel values $P_{O3}$=−1,638 and $P_{O4}$=−3,277 are mapped to $P_{N3}$=86 and $P_{N4}$=−89 respectively. Accordingly, the level function has emphasized the difference between the higher value pixels and suppressed the differences in the lower value pixels. Thus, the window and level function can be used to remap a portion of pixel intensity values of a first image to a second image, where the first and second images have different dynamic ranges.

Discussion now returns to the transmission of images with reference to FIG. 4. In some embodiments, the transmission and display of pixel data may be optimized in order to improve the responsiveness of the system. In some embodiments, a portion of the pixel data of the original requested image (e.g., high order bits in the lossy base channel 422) may be transmitted to the client 110 first. The remaining portion (e.g., delta values including the low order bits in one or more lossless delta channels 442, 444) may be generated after the first portion has been generated. In addition, the second portion is transmitted after the first portion has been transmitted. While the client 110 waits for the second portion of data to be available, the first portion is displayed. Once the second portion is available, the combined pixel data is displayed on display 123.

Figure 7:
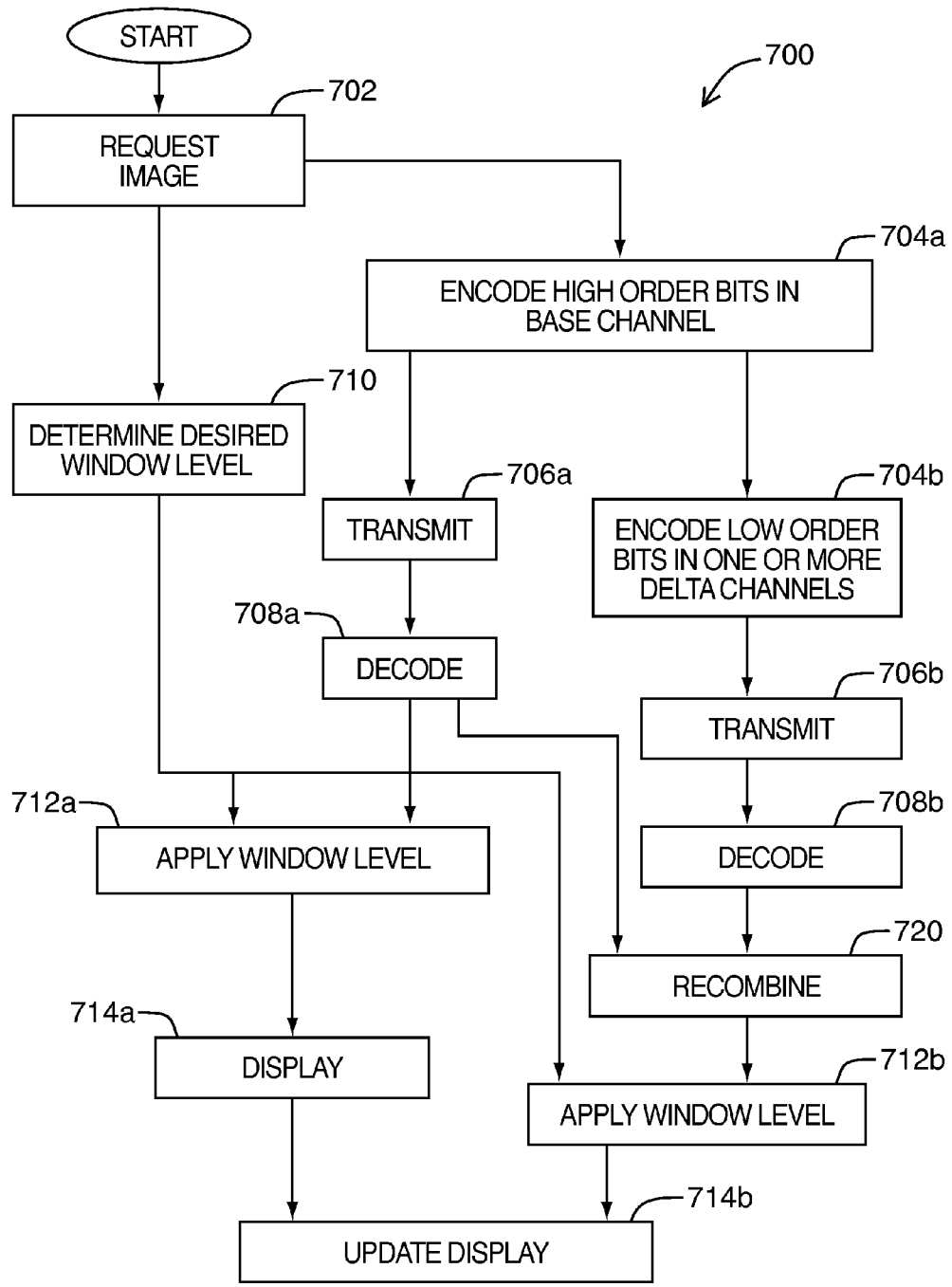
FIG. 7 is a flowchart diagram of an example set of operational steps executed when a base channel is transmitted prior to the one or more delta channels.

Reference is now made to FIG. 7 in addition to FIG. 4, which is a flowchart diagram that illustrates the basic operational steps 700 taken by image viewing system 100 when the base channel 422 is transmitted prior to the delta channels 442, 444 for improved performance, shown generally as 700.

At block 702, an image is requested from image server 109. In some embodiments, the image is a medical image. In various embodiments, the requested images can be, but are not limited to, 32 bit, 16 bit, and 12 bit images.

At block 704a, pixel data in the requested image is split into a base channel 422 and one or more delta channels 442, 444, and the contents of the base channel 422 are encoded using an encoding format. As noted above, the encoding format may be a lossy or lossless encoding format. In some embodiments, the base channel 422 may include the high order bits.

As noted above, the high order bits of the pixel data of the original image can be encoded into one or more color channels (e.g., the 'R', 'G' or 'B' color channels of a JPG image) of an encoding file format. The number of color channels used may depend on the dynamic range of the original image and the dynamic range of the color channels used to store the encoded data. As noted, the dynamic range of the color channels used to store the encoded data can be selected to be a file format that is supported by a standard browser without any additional plugins being required.

The one or more color channels can each belong to a separate image file, or groups of one or more of the color channels can be part of the same image file. In some embodiments, a single file containing more than one color channel can be used.

At block 706a, the base channel 422 containing the encoded pixel data can be transmitted from server 109 to client 110. In this way, the base channel 422 (having a high order bit range of the pixel data) can be transmitted prior to transmitting the at least one delta channels 442, 444 (including a low order bit range(s) of the pixel data).

At block 708a, the base channel 422 having the high order bit range pixel data is decoded at client 110 prior to the recombining at block 720.

At block 710, a particular window level of the original image is selected for viewing. In some embodiments, the client 110 comprises a web browser that supports only images that have a lower bit dynamic range than the original image. As indicated above, in some embodiments, the client 110 may only support 8 bit images, while the requested image is of a higher bit value such as, for example, but not limited to 12 bit or 16 bit images. Similar to the method described above, block 710 can be performed in parallel with the steps of encoding, transmitting or decoding the base channel 422. In other embodiments, block 710 is performed in series with these steps.

At block 712a, the selected window level is applied to the pixel data decoded at block 708a.

At block 714a, the selected window level (e.g., containing the decoded high order bit range pixel data) is displayed on a display 123. In various embodiments, the displayed window level is a window level of a portion of the pixel data. That is, the displayed window level can be a window level of the high order bits of the pixel data. In other embodiments, the bit range of the base channel 422 is of the appropriate length that can be displayed on the client 110 without performing a window level function. As described above, while the base channel 422 data may contain lossy values, the quick transmitting, decoding and displaying of base channel pixel data allows the system to be perceived as being more responsive while the remaining lossless data is encoded or sent.

At block 704b, the remaining portion of the pixel data is encoded in one or more delta channels 442, 444. In some embodiments, the remaining portion may include pixel data corresponding to the lower order bits of the pixel data. As described, a lossy encoding format can be used at block 704a and a lossless encoding format can be used at block 704b. In some embodiments, at block 704b a lossless difference between the pixel data and the lossy value encoded at block 704a is determined and encoded in the one or more delta channels 442, 444.

It should be understood that although an example was given where the high order bits were encoded using a lossy format and the low order bits were encoded using lossless encoding, other combinations are possible. For example, in some embodiments, both high order and low order bits are encoded using lossless encoding; in other embodiments, both high order and low order bits are encoded using lossless bits.

In some embodiments, a single image file can be used to hold the encoded data generated on block 704b. In some embodiments, more than one image file can be used. Generally, a separate image file (or a plurality of image files, in some embodiments) can be used for this step from the one or more image files that was/were used at block 704a. The reason for this is so that in some embodiments the encoded pixel data generated at block 704a is transmitted before the pixel data encoded at block 704b is available. By using separate files for the two steps, the two sets of pixel data can be transmitted separately.

At block 706b, the one or more delta channels 442, 444 containing the encoded pixel data can be transmitted from server 109 to client 110.

At block 708b, the one or more delta channels 442, 444 can be decoded at client 110.

At block 720, the decoded one or more delta channels 442, 444 can be recombined with the values earlier decoded from the base channel 422 at block 708a.

At block 712b, the determined desired window level is applied to the recombined data corresponding to the pixel data.

At block 714b, the display 123 is updated to reflect the window level having been applied to the full range of data available in the recombined data.

This embodiment of the currently described method and system can be fast and responsive to the user 111, without sacrificing an accurate image. Specifically, the initial determination, encoding, transmitting, decoding and display of the high order bits can be accomplished relatively quickly. This initial image may not always be accurate. However, the user 111 is provided with data relatively quickly and can begin to view the image data quickly as opposed to having to wait for the image to be transmitted. Meanwhile, in the background, the lower bit data can be determined, encoded, transmitted, decoded and combined with the high bit data. The display 123 is then updated with the full pixel information to produce an accurate image. In various embodiments, this allows for the display of some data almost immediately and the perfecting of the image once the additional data becomes available. The user 111 can then select a different window level of the same image and the display 123 can be updated relatively quickly because the full range of the pixel information is already at the client 110 and no further information needs to be requested from the server 109.

In some embodiments the high-order bits in the base channel being encoded in a lossy encoding image format can be approximately one tenth the size of the low order bits being encoded in a lossless encoding image format, and approximately one third the size of the same high-order bits encoded with a lossless encoding format. This means that the lossy high bit image can be generated and transmitted to the client 110 relatively quickly. This in turn means that it is available to the client 110 for display relatively quickly.

Figure 8:
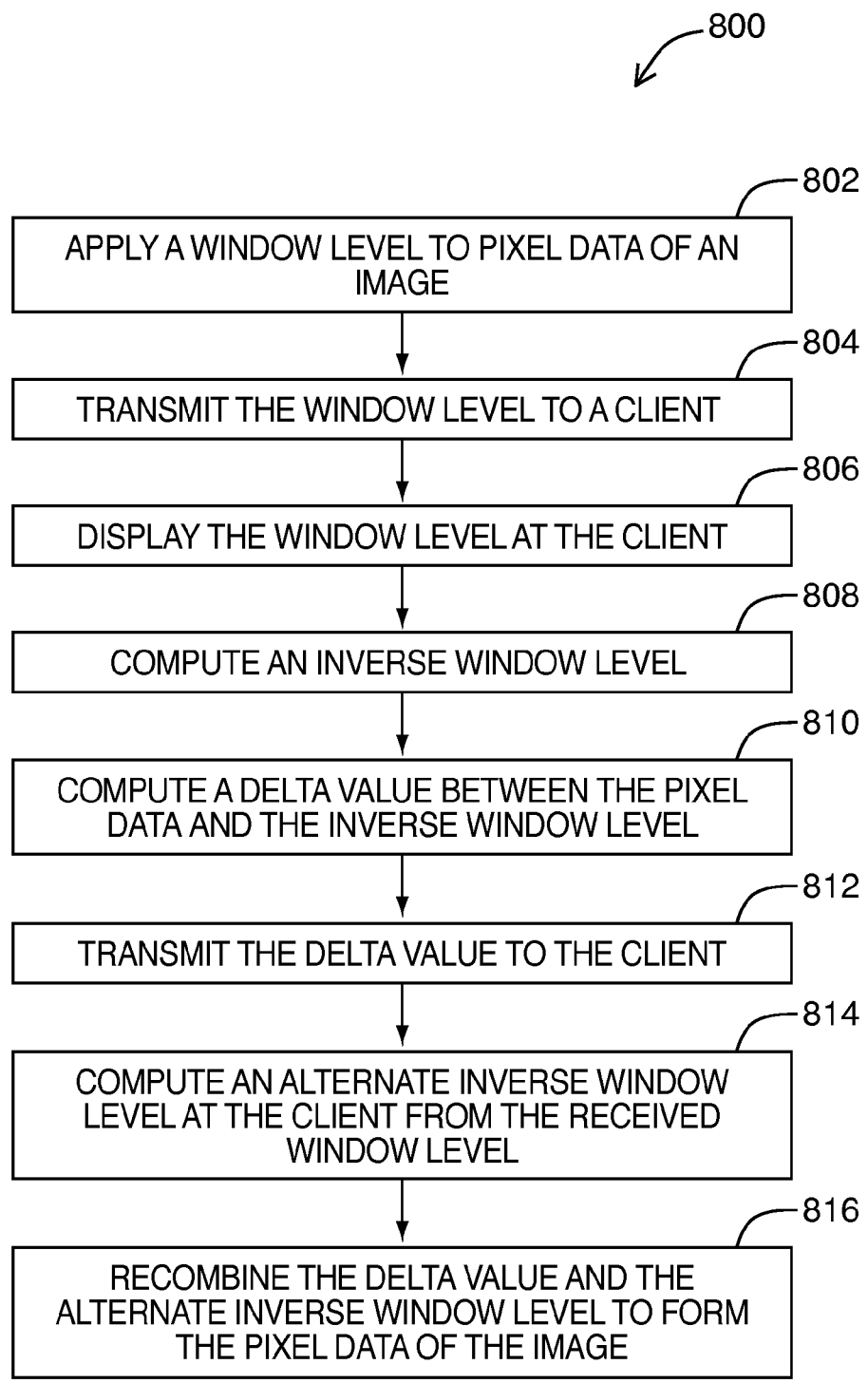
FIG. 8 is a flowchart diagram of an example set of operations for transmitting a window level to a client prior to sending a delta value.

In a further embodiment, a window level may first be applied to the pixel data at the server 109 and transmitted to the client 110 in the base channel so that it can be quickly displayed to the user. During or after transmission, a lossless difference can then be derived between the pixel data and an inverse of the window level (which can also be calculated at the client 110, as described below). This lossless difference can be placed into the delta channels and transmitted to the client 110. At the client 110, the received delta channel(s) can be recombined with an inverse window level calculated from the window level in the base channel to form the full dynamic range of the pixel data for the image. This may allow for an alternate window level to be selected and applied at the client 110. Referring to FIG. 8, illustrated there is a flowchart diagram of an example set of operations for such embodiment, referred to generally as 800.

Figures 9A, 9B:
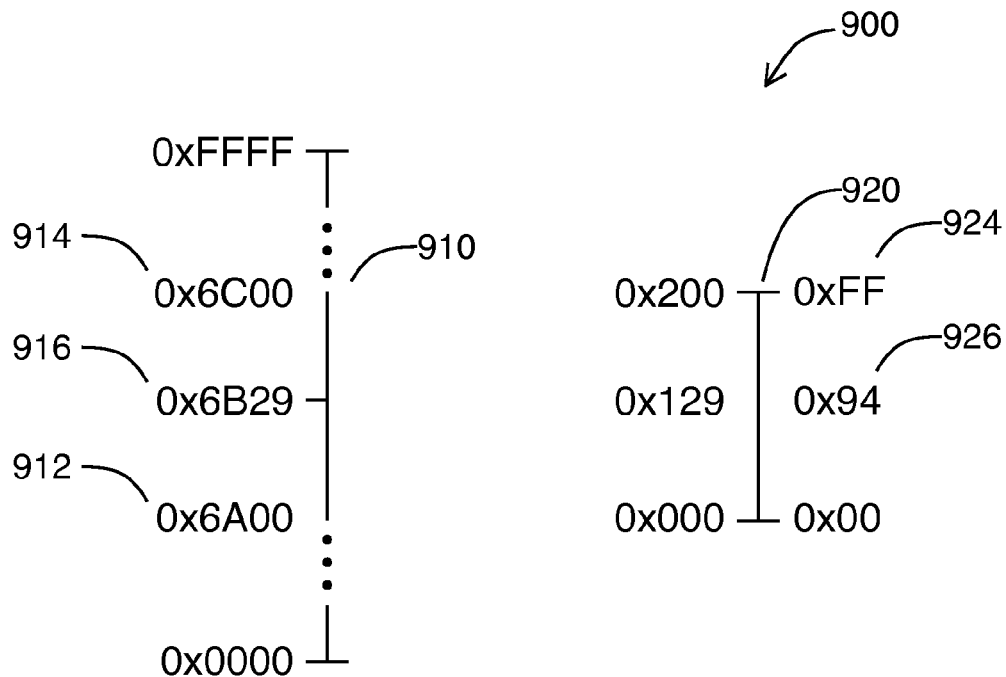
FIG. 9A is a schematic diagram illustrating an example window level applied to pixel data.
FIG. 9B is a schematic diagram of an example layout in a lossy base channel and a lossless delta channel of the window level applied in FIG. 9A.

At block 802, a window level is applied to pixel data of an image. As described above, a window level function used to derive the window level may accentuate the dynamic range in the selected window. Referring simultaneously to FIG. 9A, illustrated there generally as 900 is an example of 16-bit pixel data 910 for which the dynamic range (shown in hexadecimal format) between the minimum value 912 (0x6A00) and the maximum value 914 (0x6C00) is being accentuated. If the pixel data has a value 916 of 0x6B29 falling in this range, a window level 920 may map the value falling in this range (0x129) to the 8-bit hexadecimal value 0x94. The range of the window level for the pixel data 910 may be determined, for example, by a user selecting a maximum value 914 and a minimum value 912 at the client 110 such that those values are transmitted to the server 109 in advance of applying the window level at the server 109.

Figure 9C:
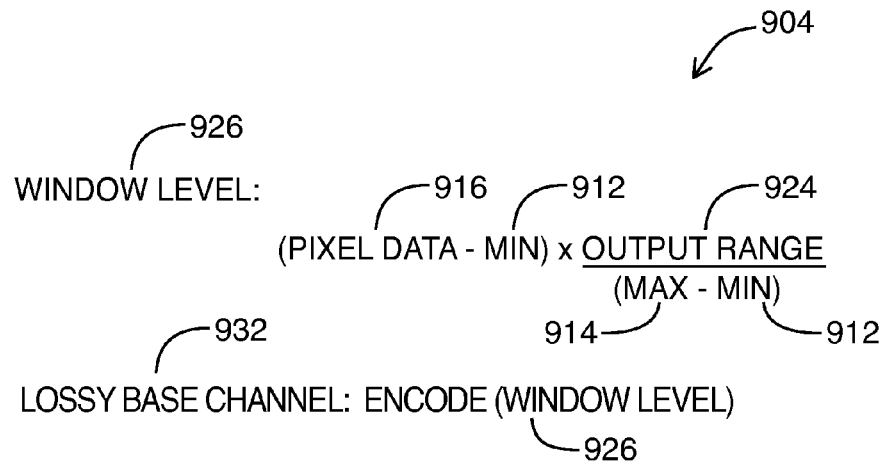
FIG. 9C is an illustration of example operations that may be used to derive the window level and the lossy base channel for the window level applied in FIG. 9A.

Referring simultaneously to FIG. 9C, shown there, generally as 904, is an example set of operations that may be performed to map the pixel data value 916 to a window leveled value 926, and for encoding the window leveled value 926 into a lossy base channel 932. The difference between the pixel data value 916 and the minimum value 912 in the window level for the pixel data may first be calculated (resulting in a value of 0x129 in FIG. 9A). This value may then be scaled to fit the output range 924 by multiplying it with the ratio of the output range 924 over the window level dynamic range of the pixel data (i.e., the maximum value 914–the minimum value 912). In the example, this results in the value of 0x129 being multiplied by a ratio of ½ (an output range of 0x100 divided by the window level dynamic range of 0x200). Multiplying by this ratio can have the effect of dividing by 2, such that the window leveled value 926 is 0x94 (as shown in FIG. 9A). It should be understood that although the window level function is illustrated as simply scaling to fit the output range 924, other window functions may also be used. It should also be understood that although an 8-bit encoding (e.g., a grayscale JPG) is illustrated as the output range 924, other output ranges 924 with other bit ranges may also be used.

At block 804, the window level (e.g., the window leveled value 926) is transmitted to a client 110. As described above, this window level data may be encoded using a lossy or lossless encoding format before transmission. Referring again to FIG. 9C, the derived window level value 926 can be encoded into a lossy base channel 932. Referring also to FIG.

9B, shown generally as 902 is a schematic diagram of an example layout in a lossy base channel 932 and a lossless delta channel 942 of the window level applied in FIG. 9A. Specifically with regards to the lossy base channel 932, it can be seen that the window leveled value 926 of 0x94 can be encoded as 0x92 in the color channel 932 of the lossy JPG encoding format (Because the encoding is lossy, the encoding is off by 2). As described above, once received at the client 110, the lossy base channel 932 can be decoded so that the window level is displayed at the client 110 (block 806).

Figure 9D:
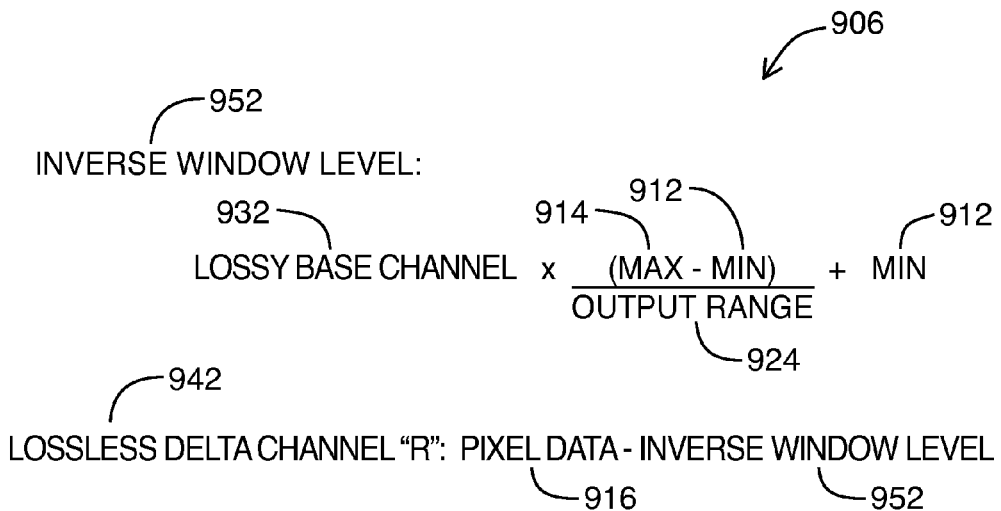
FIG. 9D is an illustration of example operations that may be used to derive an inverse window level, and the lossless delta channel for the window level applied in FIG. 9A.

At block 808, an inverse window level can be computed at the server 109. Referring simultaneously to FIG. 9D, illustrated there, generally as 906, are an example set of operations for inverting the encoded window level (i.e., as stored in the lossy base channel 932), and for calculating a delta value between the pixel data 916 and the inverse window level 952. An inverse window level 952 may be calculated by taking the encoded window level in the lossy base channel 932 (i.e., the window level value after it has been encoded using a lossy or lossless encoding format at block 804) and performing the inverse operation of the window level function. In the example, this involves multiplying the value stored in the lossy base channel 932 (0x92) by the inverse of the ratio used in block 802 (i.e., the value 2), and then subsequently adding the minimum value 912 in the window level range of the pixel data (0x6A00). This results in the inverse window level 952 (i.e., the inverse window leveled value) being calculated as 0x92×2+0x6A00, which is 0x124+0x6A00, and is equivalent to 0x6B24.

More particularly, in this particular example, the inverse ratio would be the window level dynamic range of the pixel data (i.e., the maximum value 914–the minimum value 912) divided by the output range 924 (i.e., 0x200 divided by 0x100), resulting in an inverse window level function that multiplies the value encoded in the lossy base channel 932 by 2, as noted.

Still referring to FIG. 9D, a difference between the pixel data 916 and the inverse window level 952 can then be determined (block 810). In the example, this difference would be the value 0x5; i.e., the difference between the pixel data value 916 (0x6B29, in FIG. 9A) and the inverse window level calculated at block 808 (0x6B24). It can be seen that since the delta value is calculated between the pixel data 916 and the encoded window level (i.e., as stored in the lossy base channel 932), deltas that arise due to the use of a lossy encoding format, and/or because of the window function can be captured in the delta value.

In some embodiments, blocks 808 and 810 may be performed in parallel with the transmission of the base channel 932. In various embodiments, these blocks may be performed after the transmission of the base channel 932.

The difference can then be encoded in a lossless delta channel 942, and transmitted to the client 110 (block 812). As discussed, various bits of the delta value may be encoded into a lossless encoding format such as PNG. Referring again to FIG. 9B, shown there is the value 5 being encoded into the "R" color channel 942 of a lossless PNG encoding format.

After having received the base channel 932 containing the encoded window level, the client 110 may compute an alternate inverse window level 952 from the encoded window level (block 814). Such calculation can be analogous to the operations performed on the server 109, as was described above with respect to FIG. 9D. The client 110 can then use the value in the lossy base channel 932 to complete the inverse window level operations illustrated in FIG. 9D because the maximum value 914 and minimum value 912 of the window level of the pixel data may already be stored at the client 110 when the user initially selected the window level 910 that is to be applied. Further, the client 110 would also have access to the output range 924 that the client 110 itself is capable of displaying. As such, the client 110 would be capable of calculating an alternate inverse window level 952 that has the same value as the inverse window level 952 calculated at the server 109. As noted, in the example, this value would be 0x6B24.

By calculating an inverse window level 952 at both the server 109 and the client 110, and deriving a difference between the pixel data 916 and the inverse window level 952, it can be seen that the delta value can be a small value (i.e., 0x5 in the example). Achieving a small transmitted delta value 942 may allow the encoding and transmission of the delta value to proceed more quickly. This may result in an increase in perceived responsiveness to a medical practitioner at the client 110 when selecting alternate window levels.

A small transmitted delta value in the lossless delta channel 942 may also reduce the usage of network bandwidth. In the example, it can be seen that the original pixel data 916 in FIG. 9A with 16-bits of data was able to be transmitted to the client 110 with only 12-bits of data in FIG. 9B (i.e., 8 bits in the lossy base channel 932, and 4 bits in the lossless delta channel 942). Such reduction in network bandwidth usage may become especially pronounced if the full dynamic range for many pixels need to be transmitted.

Figure 9E:
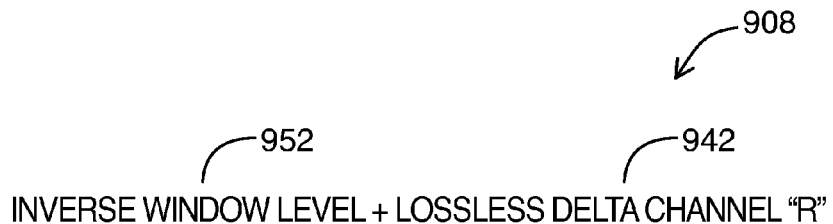
FIG. 9E is an illustration of example operations that may be used to reform the pixel data from the base and delta channels illustrated in FIG. 9B.

Once the delta channel 942 has been received at the client 110, it can be recombined with the alternate inverse window level 952 calculated at the client 110 to form the pixel data 916 in the image (block 816). Referring to FIG. 9E, shown there, generally as 908, are example operations that may be performed to recombine alternate inverse window level 952 with the delta value in the lossless delta channel "R" 942 to form the pixel data 916. In the example, this may be just adding the inverse window level 952 value (0x6B24) with the delta value (0x5) to arrive at 0x6B29, which is the original pixel data 916.

As described above, the operations used to recombine the base and delta channels may use simple arithmetic operations that may be incorporated into a scripting language that is understood by a standard application (such as a browser) on a remote computing device.

Once the pixel data has been reformed, an alternate window level can be applied at the client 110. This may happen, for example, if a medical practitioner viewing the window level data desires to accentuate another segment of the dynamic range in the original pixel data. Such alternate window levels may then subsequently be displayed to the medical practitioner viewing the image.

Sending a window level in advance of the delta value may allow medical practitioners to be more efficient. That is, they may be able to start analyzing the image in the specific range of intensities they are interested in while the full dynamic range data is being transmitted. For example, a medical practitioner may only be interested in examining the bone (typically shown in medical images as having high intensity, i.e., white) present in a medical image. If a window level function 920 accentuating the high intensity values is applied on the server 109 and transmitted in the base channel 932 to the client 110, the medical examiner may begin examining such image in the range he or she desires while the delta value 942 corresponding to the remaining pixel data is encoded and transmitted. If the medical examiner subsequently selects an alternate window level 920, the full dynamic range of the pixel data (i.e., the inverse window level 952 formed from the window level in the base channel 932, combined with the one or more delta channels 942) will be available on the client 110 so that an alternate window level 920 can be applied.

As described above, in various embodiments, the methods and systems described herein allow the transmission of larger than 8 bit data across 8 bit channels in a browser that does not support direct encoding and encoding of large bit format images.

In various embodiments, client 110 can comprise a standard web browser, without any additional plugins or other modifications. In some embodiments, JavaScript can be used to implement some of the modules disclosed herein including, but not limited to, decoding module 120 and window leveling module 121.

While the various example embodiments of the image viewing system 100 have been described in the context of medical image management in order to provide an application-specific illustration, it should be understood that localizer display system 100 could also be adapted to any other type of image or document display system.

For example, medical images typically only have one color channel for pixel data (e.g. a grayscale image). However, it should be understood that the described methods and systems can be applied to more complex images with multiple color channels that each have their own dynamic range that that cannot properly be encoded into a selected encoding format. In such case, the methods described herein may be respectively applied to the bit range in each color channel of such image. This would involve splitting such bit range into a base channel and one or more delta channels that can be transmitted and recombined at a client to reconstitute the high bit-range color channel of such image. Such method would involve encoding an image, the image having pixel data and at least one color channel; the method including: encoding the image by splitting the pixel data of each color channel into a base channel and at least one delta channel.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of processing a first image at a server, the method comprising:
    identifying the first image, the first image being formatted according to a first encoding format that allows pixel data of the first image to be stored with a first bit range, the first bit range being greater than a second bit range of a color channel in a second encoding format, wherein the first encoding format is not supported by a client, and the second encoding format is supported by the client;
    splitting the pixel data of the first image into a base portion and at least one delta portion, wherein the base portion and the at least one delta portion each have a bit range that is less than the first bit range;
    encoding the base portion into a color channel of a second image that is formatted according to the second encoding format, wherein the second encoding format comprises a lossy encoding format such that the encoded base portion stored in the second image comprises lossy encoded values;
    transmitting the second image to the client;
    calculating a lossless difference between the base portion resulting from the splitting and the lossy encoded values of the encoded base portion stored in the second image;
    identifying the lossless difference as one of the at least one delta portion;
    encoding the one of the at least one delta portion into a color channel of a third image that is formatted according to a third encoding format, the third encoding format comprising a color channel with a third bit range that is less than the first bit range, wherein the third encoding format is supported by the client, and the third encoding format comprises a lossless encoding format; and
    transmitting the third image to the client;
    wherein the client extracts an encoded base portion from the color channel of the second image, decodes the encoded base portion, extracts an encoded delta portion from the color channel of the third image, decodes the encoded delta portion, and uses at least the decoded base portion to generate a window level of the first image to be displayed at the client.

2. The method of claim 1, wherein the transmitting of the second image to the client is performed in parallel with the encoding of the one of the at least one delta portion and the transmitting of the third image to the client, so that the client receives the second image prior to receiving the third image, and wherein the client is configured to begin extracting the encoded base portion from the second image and the decoding of the encoded base portion upon receipt of the second image.

3. The method of claim 1, wherein prior to the splitting of the pixel data of the first image, the method further comprises:
    receiving input indicating the window level of the first image to be displayed at the client;
    wherein the splitting the pixel data of the first image comprises:
        generating the window level of the first image by applying a window level function to the pixel data, and
        identifying the generated window level as the base portion of the pixel data that is to be encoded into the color channel of the second image; and
    wherein the client extracts an encoded window level corresponding to the generated window level from the color channel of the second image and decodes the encoded window level, the decoded window level being used as the window level of the first image to be displayed at the client.

4. A server for processing a first image, the server comprising a memory for storing instructions which, when executed by a processor coupled to the memory, causes the processor to:
    identify the first image at a server, the first image being formatted according to a first encoding format that allows pixel data of the first image to be stored with a first bit range, the first bit range being greater than a second bit range of a color channel in a second encoding format, wherein the first encoding format is not supported by a client, and the second encoding format is supported by the client;
    split the pixel data of the first image into a base portion and at least one delta portion, wherein the base portion and the at least one delta portion each have a bit range that is less than the first bit range;
    encode the base portion into a color channel of a second image that is formatted according to the second encoding format, wherein the second encoding format comprises a lossy encoding format such that the encoded base portion stored in the second image comprises lossy encoded values;

transmit the second image to the client;

calculate a lossless difference between the base portion resulting from the splitting and the lossy encoded values of the encoded base portion stored in the second image;

identify the lossless difference as one of the at least one delta portion;

encode the one of the at least one delta portion into a color channel of a third image that is formatted according to a third encoding format, the third encoding format comprising a color channel with a third bit range that is less than the first bit range, wherein the third encoding format is supported by the client, and the third encoding format comprises a lossless encoding format; and transmit the third image to the client;

wherein the client extracts an encoded base portion from the color channel of the second image, decodes the encoded base portion, extracts an encoded delta portion from the color channel of the third image, decodes the encoded delta portion, and uses at least the decoded base portion to generate a window level of the first image to be displayed at the client.

5. The server of claim 4, wherein the transmitting of the second image to the client is performed in parallel with the encoding of the one of the at least one delta portion and the transmitting of the third image to the client, so that the client receives the second image prior to receiving the third image, and wherein the client is configured to begin extracting the encoded base portion from the second image and the decoding of the encoded base portion upon receipt of the second image.

6. The server of claim 4, wherein prior to the splitting of the pixel data of the first image, the processor is further configured to:

receive input indicating the window level of the first image to be displayed at the client;

wherein when splitting the pixel data of the first image, the processor is further configured to:

generate the window level of the first image by applying a window level function to the pixel data, and identify the generated window level as the base portion of the pixel data that is to be encoded into the color channel of the second image; and wherein the client extracts an encoded window level corresponding to the generated window level from the color channel of the second image and decodes the encoded window level, the decoded window level being used as the window level of the first image to be displayed at the client.

7. A method of processing a second image and a third image at a client, the method comprising:

receiving the second image, the second image being formatted according to a second encoding format having a color channel with a second bit range, the second bit range being less than a first bit range of pixel data from a first image that is formatted according to a first encoding format, wherein the first encoding format is not supported by the client and the second encoding format is supported by the client;

extracting an encoded base portion of the pixel data from the color channel of the second image, the encoded base portion having been encoded into the color channel of the second image after the pixel data of the first image was split into a base portion and at least one delta portion, wherein the base portion and the at least one delta portion each have a bit range that is less than the first bit range, and wherein the second encoding format comprises a lossy encoding format such that the encoded base portion stored in the second image comprises lossy encoded values;

decoding the encoded base portion;

receiving the third image that is formatted according to a third encoding format, the third encoding format comprising a color channel with a third bit range that is less than the first bit range, wherein the third encoding format is supported by the client, and wherein the third encoding format comprises a lossless encoding format such that a color channel of the third image comprises a lossless difference between the base portion resulting from the splitting and the lossy encoded values of the encoded base portion stored in the second image;

identifying the lossless difference as an encoded delta portion of the pixel data corresponding to one of the at least one delta portion of the pixel data that was split from the base portion;

decoding the encoded delta portion;

using at least the decoded base portion to generate a window level of the first image; and displaying the window level at the client.

8. The method of claim 7, wherein the method further comprises:

recombining the decoded base portion with the decoded delta portion when forming the pixel data of the first image; and applying a window level function to the recombined pixel data to generate the window level of the first image to be displayed at the client.

9. The method of claim 7, wherein the second image is received prior to the third image, and wherein the extracting of the encoded base portion from the second image and the decoding of the encoded base portion is started upon receipt of the second image.

10. The method of claim 7, wherein the encoded base portion extracted from the color channel of the second image comprises an encoded window level of the first image that is generated at a server by applying a window level function to the pixel data, and wherein the decoding of the encoded base portion comprises decoding the encoded window level, and the decoded window level being used as the window level of the first image to be displayed at the client.

11. A client device for processing a second image and a third image, the client device comprising a memory for storing instructions which, when executed by a processor coupled to the memory, cause the processor to:

receive the second image, the second image being formatted according to a second encoding format having a color channel with a second bit range, the second bit range being less than a first bit range of pixel data from a first image that is formatted according to a first encoding format, wherein the first encoding format is not supported by the client and the second encoding format is supported by the client;

extract an encoded base portion of the pixel data from the color channel of the second image, the encoded base portion having been encoded into the color channel of the second image after the pixel data of the first image was split into a base portion and at least one delta portion, wherein the base portion and the at least one delta portion each have a bit range that is less than the first bit range, and wherein the second encoding format comprises a lossy encoding format such that the encoded base portion stored in the second image comprises lossy encoded values;

decode the encoded base portion;
receive the third image that is formatted according to a third encoding format, the third encoding format comprising a color channel with a third bit range that is less than the first bit range, wherein the third encoding format is supported by the client, and wherein the third encoding format comprises a lossless encoding format such that a color channel of the third image comprises a lossless difference between the base portion resulting from the splitting and the lossy encoded values of the encoded base portion stored in the second image;
identify the lossless difference as an encoded delta portion of the pixel data corresponding to one of the at least one delta portion of the pixel data that was split from the base portion;
decode the encoded delta portion;
use at least the decoded base portion to generate a window level of the first image; and
display the window level at the client.

12. The client device of claim 11, wherein the processor is further configured to:

recombine the decoded base portion with the decoded delta portion when forming the pixel data of the first image; and apply a window level function to the recombined pixel data to generate the window level of the first image to be displayed at the client.

13. The client device of claim 11, wherein the second image is received prior to the third image, and wherein the extracting of the encoded base portion from the second image and the decoding of the encoded base portion is started upon receipt of the second image.

14. The client device of claim 11, wherein the encoded base portion extracted from the color channel of the second image comprises an encoded window level of the first image that is generated at a server by applying a window level function to the pixel data, and wherein the decoding of the encoded base portion comprises decoding the encoded window level, and the decoded window level being used as the window level of the first image to be displayed at the client.

* * * * *